(12) United States Patent
Chen et al.

(10) Patent No.: US 9,986,154 B2
(45) Date of Patent: May 29, 2018

(54) DEVELOPING A PANORAMIC IMAGE (71) Applicant: HERE Global B.V., Eindhoven (NL)

(72) Inventors: Xin Chen, Evanston, IL (US); Roman Ostrovskiy, Prospect Heights, IL (US)

(73) Assignee: HERE Global B.V., Eindhoven (NL)

( * ) Notice: Subject to any disclaimer, the term of this patent is extended or adjusted under 35 U.S.C. 154(b) by 284 days.

(21) Appl. No.: 14/283,566

(22) Filed: May 21, 2014

(65) Prior Publication Data
US 2015/0341552 A1 Nov. 26, 2015

(51) Int. Cl.
H04N 5/232 (2006.01)
G06T 11/60 (2006.01)
H04N 13/02 (2006.01)
G06T 15/00 (2011.01)
G06T 17/00 (2006.01)

(52) U.S. Cl.
CPC ......... *H04N 5/23238* (2013.01); *G06T 11/60* (2013.01); *G06T 15/00* (2013.01); *G06T 17/00* (2013.01); *G06T 2210/56* (2013.01)

(58) Field of Classification Search
CPC ........... H04N 5/23238; H04N 13/0203; H04N 5/232; G06T 11/60; G06T 15/00; G06T 17/00
USPC .......................................................... 348/38
See application file for complete search history.

(56) References Cited

U.S. PATENT DOCUMENTS

| 5,495,576 A * | 2/1996 | Ritchey | G06T 17/00 345/420 |
| 6,246,413 B1 * | 6/2001 | Teo | G06T 17/00 345/419 |
| 8,553,942 B2 * | 10/2013 | Lynch | G01C 3/00 382/106 |
| 2006/0055807 A1 * | 3/2006 | Pemer | H04N 5/23238 348/333.11 |
| 2009/0034086 A1 * | 2/2009 | Montgomery | G03B 35/10 359/629 |
| 2013/0325903 A1 * | 12/2013 | Rohlf | G06F 17/30241 707/797 |
| 2014/0300758 A1 * | 10/2014 | Tran | H04N 5/225 348/207.1 |
| 2015/0172628 A1 * | 6/2015 | Brown | G06T 17/10 348/47 |

(Continued)

OTHER PUBLICATIONS

Alexa et al., Computing and Rendering Point Set Surfaces, Jan. 2003, IEEE TVCG.

(Continued)

*Primary Examiner* — Andy Rao
*Assistant Examiner* — Zaihan Jiang
(74) *Attorney, Agent, or Firm* — Alston & Bird LLP (57) ABSTRACT Systems, apparatus, and methods are provided for producing an improved panoramic image. A three-dimensional point cloud image is generated from an optical distancing system. Additionally, at least one two-dimensional image is generated from at least one camera. The three-dimensional point cloud image is colorized with the at least one two-dimensional image, thereby forming a colorized three-dimensional point cloud image. An equal area projection panoramic image is synthesized from the colorized three-dimensional point cloud, wherein the panoramic image comprises a plurality of pixels, and each pixel in the plurality of pixels represents a same amount of area.

11 Claims, 7 Drawing Sheets (56) References Cited

U.S. PATENT DOCUMENTS

2015/0199839 A1* 7/2015 Chon ............... G06K 9/4633
345/427

OTHER PUBLICATIONS

Besk et al., A Method for Registration of 3-D Shapes, Feb. 1992, vol. 14, No. 2, IEEE Transactions on Pattern Analysis and Machine Intelligence.
Castillo et al., Point Cloud Segmentation via Constrained Nonlinear Least Squares Surface Normal Estimates, 2009, Recent UCLA Computational and Applied Mathematics Reports.
Chen et al., Range Image Segmentation for Modeling and Object Detection in Urban Scenes. 2007, 3-D Digital Imaging and Modeling, Sixth International Conference on. IEEE.
Elaksher et al., Reconstructing 3D Buildings from Lidar Data, 2002, International Archives of Photogrammetry Remote Sensing and Spatial Information Sciences.
Hernandez et al., Filtering of Artifacts and Pavement Segmentation from Mobile LiDAR Data, 2009, ISPRS Workshop Laserscanning, Paris, France.
Hernandez et al., Point Cloud Segmentation Towards Urban Ground Modeling, 2009, IEEE.
Johnson et al., Using Spin Images for Efficient Object Recognition in Cluttered 3D Scenes, 1999, Pattern Analysis and Machine Intelligence IEEE.
Koran et al., Strip Histogram Grid for Efficient LIDAR Segmentation from Urban Environments, Jun. 2011, Computer Vision and Pattern Recognition Workshops, Computer Society Conference on IEEE.
Moosmann et al., Segmentation of 3D Lidar Data in Non-Flat Urban Environments Using a Local Convesity Criterion, 2009, Intelligent Vehicles Symposium.
Munoz et al., Directional Associative Markov Network for 3-D Point Cloud Classification, Jun. 2008, International Symposium on 3D Processing.
Nan et al., SmartBoxes for Interactive Urban Reconstruction, 2010, ACM Transactions on Graphics.
U.S. Appl. No. 14/038,322, filed Sep. 26, 2013.
U.S. Appl. No. 14/150,147, filed Jan. 8, 2014.
Wang et al., A Hole-Filling Strategy for Reconstruction of Smooth Surfaces in Range Images, Oct. 12-15, 2003, Computer Graphics and Image Processing.
Wang et al., Lidar Data Segmentation and Classification Based on Octree Structure, 2004, Int. Archives of Photogrammetry and Remote Sensing.
Zavodny et al., Region Extraction in Large-Scale Urban Lidar Data, 2009, Computer Vision Workshops, IEEE 12th International Conference on IEEE.
Zheng et al., Non-Local Scan Consolidation for 3D Urban Scenes, 2010, ACM Siggraph.

* cited by examiner

DEVELOPING A PANORAMIC IMAGE

FIELD

The following disclosure relates to panoramic imagery. In particular, the following disclosure relates to systems, apparatuses, and methods for reducing the data size while maintaining the image quality in a panoramic image.

BACKGROUND

Panoramic imagery may be captured at a location (e.g., roadway) to create an immersive navigation environment. Images for the panoramic imagery may be captured using a spherical digital camera apparatus having multiple camera lenses (e.g., six camera lenses) directed in multiple directions. PC graphics cards may then process and compile the image textures onto polygon meshes.

Immersive navigation applications commonly specify a spherical view and the polygon meshes are projected and arranged in 3-dimensional coordinates, forming a projected image. Plate carrée projections or equirentangular projections may be used to save the projected image instead of each original image captured from the multiple cameras on the digital camera apparatus.

Plate carrée has become a de facto projection standard for computer applications that process global maps, because of the particularly simple relationship between the position of an image pixel on the map and its corresponding geographic location on Earth. These projections are also handled by application programming interfaces such as OpenGL. An alternative projection approach for the panoramic image is a cubic projection, where four cube faces cover the front, right, back, and left, and one cube face covers the zenith (top) and an additional cube face covers the nadir (bottom).

One difficulty with plate carrée or cubic projections is that the rendering software may generate a larger data file than needed to approximate the panoramic image or sphere. Therefore, there is a continuing effort to provide improved systems and methods for developing panoramic images with reduced data file sizes while retaining or improving the image quality.

SUMMARY

Systems, apparatuses, and methods are provided for reducing data in panoramic imagery. In one embodiment, the method comprises receiving a three-dimensional point cloud generated from an optical distancing system. The method further comprises receiving at least one two-dimensional image generated from at least one camera. The method further comprises colorizing the three-dimensional point cloud with the at least one two-dimensional image, thereby forming a colorized three-dimensional point cloud. The method further comprises synthesizing, using a processor, an equal area projection panoramic image from the colorized three-dimensional point cloud, wherein the panoramic image comprises a plurality of pixels, and each pixel in the plurality of pixels represents a same amount of area.

In another embodiment, the apparatus comprises at least one processor and at least one memory including computer program code for one or more programs; the at least one memory and the computer program code configured to, with the at least one processor, cause the apparatus to at least perform: (1) receive a three-dimensional point cloud image generated from an optical distancing system; (2) receive at least one two-dimensional image generated from at least one camera; (3) colorize the three-dimensional point cloud image with the at least one two-dimensional image to form a colorized three-dimensional point cloud image; and (4) synthesize an equal area projection panoramic image from the colorized three-dimensional point cloud, wherein the panoramic image comprises a plurality of pixels, and each pixel in the plurality of pixels represents a same amount of area.

BRIEF DESCRIPTION OF THE DRAWINGS

Exemplary embodiments are described herein with reference to the following drawings.

DETAILED DESCRIPTION

Data acquisition techniques may be used to develop improved panoramic images through the collection and processing of both two dimensional (2D) images and three dimensional (3D) point clouds representing a geographic area and any structures included therein.

Such a panoramic image may provide an improvement over conventionally produced images. For example, the file size or overall resolution of the improved panoramic image may be reduced by upwards of 25% while preserving the quality of the panoramic image by avoiding oversampling image data. In some embodiments, the process of forming the improved panoramic image may provide a higher quality panoramic image over conventional techniques (e.g., plate carrée or cubic projections) by avoiding undersampling image data. Additionally, the process may allow for faster streaming or data transfer of the image to an end-user on a personal computer or mobile device.

In certain embodiments, the improved panoramic image is developed by: (1) collecting 3D cloud point data, (2) collecting 2D image data, (3) colorizing the 3D cloud point data with the 2D image data, (4) developing an equal area projection panoramic image from the colorized 3D point cloud data; and (5) storing the panoramic image.

Collection of 3D Point Cloud Data

In certain embodiments, the 3D data are "depth maps" or "point cloud" data acquired using 3D optical distancing systems or intensity-based scanning techniques, such as those described in U.S. Pat. No. 8,553,942, herein incorporated by reference in its entirety. In certain embodiments, depth maps or point cloud data are collected using a Light Detection and Ranging (LIDAR) system. LIDAR, also known as LiDAR, Lidar, or other similar representations, may also be referred to as three-dimensional laser scanning or an optical distancing system, which employs one or more lasers or "cameras" to collect data points representing an area, such as an area about a road or walkway. Software generates the depth map or point cloud based on the measured distance, the locations of the optical distancing system, which may be on a moving platform such as a car, and the angle of the laser. Other optical distancing systems include a stereoscopic camera, a time of flight infrared camera, and a structured light device. A LIDAR device collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

In one embodiment, a LIDAR data acquisition system may be attached or otherwise integrated with a vehicle. There may also be a positioning system integrated with the LIDAR vehicular system such as a GPS to provide a base reference for the data acquired by the LIDAR system. The mobility of a vehicular system may facilitate acquiring data across a large geographic area using established positions for reference and integration of the acquired data into a point cloud representing the geographic area.

Figure 1:
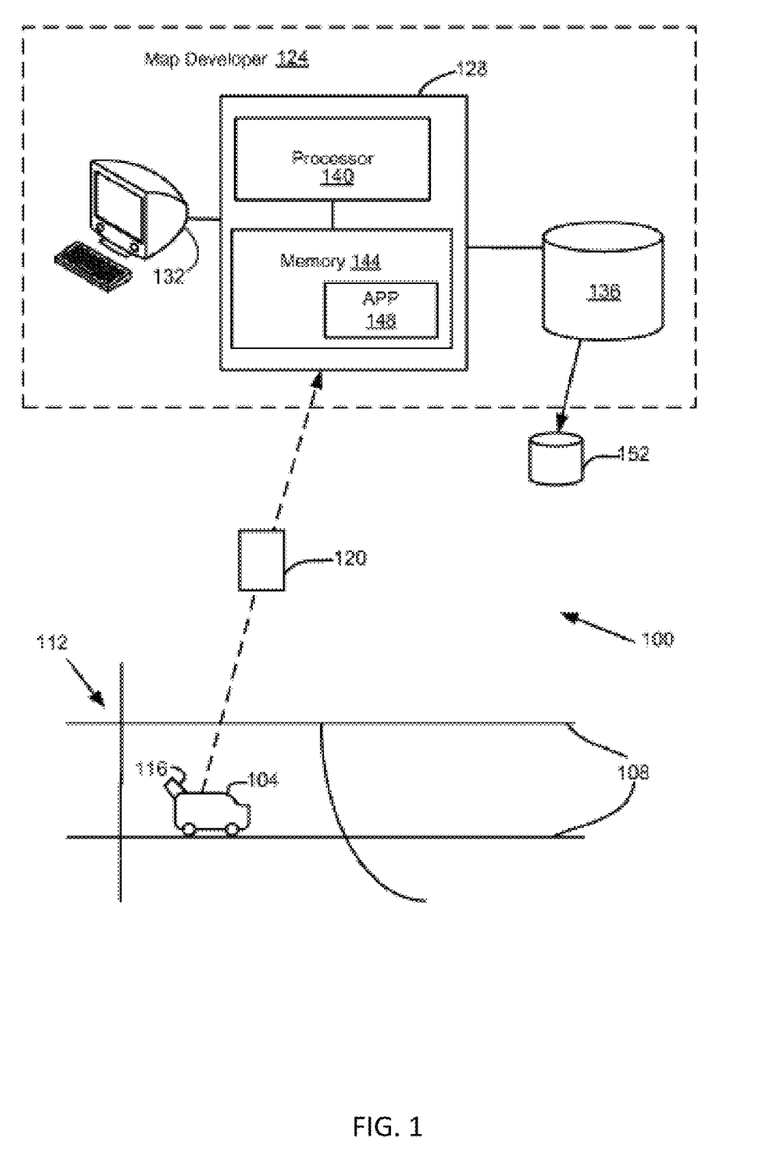
FIG. 1 is a diagram of an exemplary geographic and/or navigation data system.

FIG. 1 shows one embodiment of a geographic and/or navigation data system 100 useful for collecting the 3D data points. The geographic data or navigation system 100 includes, but is not limited to, an object 104 travelling on a path network 108 in a geographic region 112, a device 116, a processing device 128, a workstation or computer 132, and/or a database 136. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, network connections, and/or network interfaces may be provided. While the components in FIG. 1 are shown as separate from one another, one or more of these components may be combined.

The object 104 is a vehicle, such as a car, truck, motorcycle, bicycle, Segway, or other transportation device or mechanical device used to move on the path network 108. Alternatively, the object 104 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. Alternatively, the path network 108 may be an open area space with no specific paths or travel constraints. The path network 108 is in the geographic region 112, such as a city, a suburb, a state, a country, and/or other geographic region.

The object 104 travels along or moves about the path network 108 to collect data. A supporting device or housing 116 is attached or connected with or carried by the object 104. The supporting device 116 may be or may include equipment to collect data representing an area about or around a road or path or other area. For example, the collected data may be laser, LIDAR, imagery, and/or video/camera data (such as in the visible spectrum or other spectrum). Other data such as location data, GPS data, and/or other geographic data may be collected.

In one embodiment, the supporting device 116 is a housing or container that is attached to or carried by a pedestrian (the object 104), and as the pedestrian is on and/or moving on a path, sidewalk, or other area, equipment, such as a LIDAR device and/or camera, in the supporting device 116 collects data. In another embodiment, the supporting device 116 is a housing or container that is attached to a vehicle and, as the vehicle is on and/or moving on a road or path, equipment, such as a LIDAR device and/or camera, in the supporting device 116 collects or gathers data corresponding to the surrounding area. Alternatively, the supporting device 116 may be the LIDAR device or camera device itself or parts thereof. The supporting device 116 may be positioned at a backend of a vehicle or object and may be angled to enhance collection. In other embodiments, the supporting device 116 may be positioned any place on a vehicle, pedestrian, or object and in any direction.

The collected data is stored on one or more non-transitory computer-readable media 120, such as a CD-ROM, DVD, flash drive, hard drive, or other tangible media suitable to store data. Different types of data may be stored on the same medium 120. Alternatively, separate non-transitory media 120 may be used to store separate or different types of data. In one embodiment, LIDAR or laser data, photographs (such as digital or electronic photographs), video images, and/or other image data collected by the object 104 and/or the device 116 are stored in one or more non-transitory media 120. Alternatively, the non-transitory media 120 may be signals carrying or having data. The collected LIDAR or image data may represent areas or regions about or around a path, road, or other area. The collected laser or LIDAR data and/or images may include geographic features, such as sky features, terrain or surrounding features, roads or paths (such as sidewalks), road or path markings (such as crosswalks or lane markings), road or path signs, points-of-interest ("POIs") such as buildings, parks, museums, etc., and/or other features or objects.

The collected image data, via one or more non-transitory media 120, is sent to a map, geographic, and/or navigation data developer 124, such as HERE, NAVTEQ, or Nokia Corporation. For example, a non-transitory medium 120 may be mailed to or brought to the map developer 124. Alternatively, some or all of the collected data may be transmitted to the map developer 124 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 128 maintained by the map developer 124 receives the collected data. The processing device 128 is one or more servers, computers (such as a desktop tower or a laptop processing unit), processors, and/or other electronic processing systems or devices. The processing device 128 includes, but is not limited to, a processor 140, a memory 144, and an image software application 148. Additional, fewer, or different components may be provided.

The processing device 128 may include or be in communication with the workstation or computer 132. For example, the workstation 132 is a user interface, electronic console, and/or computer with one or more input devices that may be used to access, control, and/or communicate with the processing device 128 or components thereof.

The processor 140 is a general processor, application-specific integrated circuit ("ASIC"), digital signal processor, field programmable gate array ("FPGA"), digital circuit, analog circuit, or combination thereof. In one embodiment, the processor 140 is one or more processors operable to control and/or communicate with the various electronics and logic of the processing device 128. The memory 144 is any known or future storage device. The memory 144 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 144 may be part of the processor 140. The memory 144 is operable or configured to store laser, LIDAR, and/or image data or other data.

The processor 140 or other processor is configured or adapted to execute the image software application 148, which may be stored in the memory 144 or other memory. For example, the image software application 148 generates a multi-layered image (such as a two-dimensional scalable vector graphics ("SVG") multi-layered image) based on model data, such as three-dimensional model data corresponding to a geographic area. In one embodiment, the application 148 identifies and/or receives three-dimensional model data, such as collected three-dimensional LIDAR point cloud data, and performs processes or rendering sequences, which are discussed in detail below, to generate a multi-layered graphics image of a geographic area. The generated multi-layered graphics image may be used in navigation or geographic systems as well as in a variety of user interfaces, devices, or systems. Also, the generated multi-layered graphics image may be provided to developers of such systems and/or devices for configuration purposes.

In one embodiment, one or more generated multi-layered graphics images are stored, linked, indexed, and/or associated with or in the database 136, which is in communication with the processing device 128. Alternatively, one or more generated multi-layered graphics images are stored in one or more separate or different databases that may or may not be associated with the database 136 or data thereof. In one embodiment, the geographic database 136 includes data used for navigation-related and/or geographic-related services. For example, the geographic database 136 contains road segment/link and node data records that represent a road network, such as the path network 108. A node represents an end point of a road segment and/or intersection points. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 136 contains path segment/link and node data records or other data that represent pedestrian paths in addition to or instead of the vehicle road record data.

The geographic database 136 may be a master geographic database that is stored in a format that facilitates updating, maintenance, and development. For example, the master geographic database 136 or data in the master geographic database 136 is in an Oracle spatial format, such as for development or production purposes. The Oracle spatial format or development/production database may be compiled into a delivery format, such as a GDF format.

The data in the production and/or delivery formats may be compiled or further compiled to form geographic database products or databases 152, which may be used in end user navigation devices or systems or other systems or devices. For example, a customer of the map developer 124 (such as a developer of navigation devices or systems) may receive generated multi-layered graphics images as well as other geographic data in a delivery format and then compile and/or configure such data for end user devices. In one embodiment, geographic data is compiled (such as into a PSF format) to organize and/or configure the data (e.g., segment/link, node, multi-layered graphics image, and/or other data or attributes) for performing navigation-related functions and/or services such as route calculation, route guidance, map display, speed calculation, distance and travel time functions, and other functions, by a navigation device. The navigation-related functions may correspond to vehicle navigation, pedestrian navigation, or other types of navigation.

Figure 2:
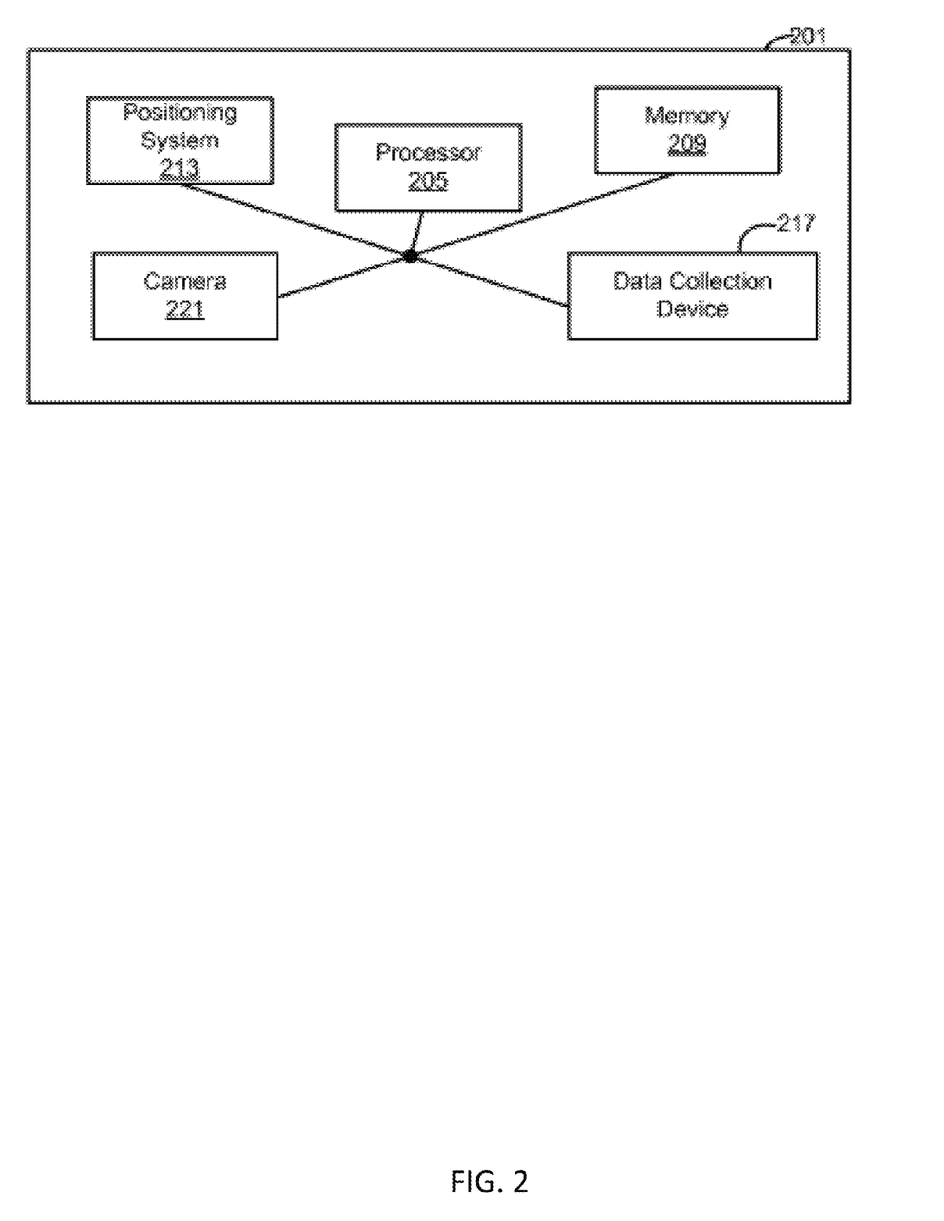
FIG. 2 illustrates an embodiment of components of a device used in the exemplary system of FIG. 1.

FIG. 2 illustrates an embodiment of components of a device 201. For example, the device 201 may be an embodiment of the object 104, such as a vehicle, or may be similar to the supporting device 116. In one embodiment, the device 201 is a support or housing that includes equipment to collect data. For example, the device 201 is removably or integrally attached or connected with a vehicle. The device 201 is positioned at a top backend of the vehicle. Alternatively, the device 201 may be positioned on or in any part of the vehicle at any angle. In another embodiment, the device 201 is attached to or carried by a pedestrian. For example, the device 201 may be a LIDAR device or other device for collecting three-dimensional data.

The device 201 includes, but is not limited to, a processor 205, a memory 209, a positioning system 213, a data collection device 217, and a camera or camera device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or on another part of the vehicle while the data collection device 217 and the camera 221 are in the device 201. The data collection device 217 and the camera 221 may also be separated into different enclosures or supports.

The processor 205 is similar to or different than the processor 140. The processor 205 is configured to operate the collection equipment, such as the positioning system 213, the data collection device 217, and the camera system 221. For example, the processor 205 sends commands to the various collection devices to collect data and synchronizes or manages the different components. Also, the processor 205 is configured to store data from the collection devices into the memory 209. The memory 209 is similar to or different than the memory 144. The memory 209 is operable or configured to store collected light, laser, LIDAR, image, and/or position data or other data. The memory 209 may be part of the non-transitory computer-readable medium 120 or may be a separate memory.

The positioning system 213 is a GPS system, one or more mechanical and/or electrical sensors, one or more gyroscopes, a local positioning system, one or more direction sensors, or other system or device for providing position data, such as location data (e.g., longitude, latitude, and/or altitude) and/or direction data, of the device 201, components thereof, or an attached object, such as a vehicle.

The camera 221 is one or more cameras used for taking pictures or videos of a surrounding area. For example, the camera system 221 includes a video camera that records video data (such as in the visible light spectrum) representing geographic features of and about a road or path as a vehicle drives along the road or path. The camera 221 may also capture still photographs separate from the video data. The camera 221 is able to capture different colors and associated text of geographic features.

The data collection device 217 may be a light data collection device. For example the device or system 217 may include a light source and a light receiver. In one embodiment, the data collection 217 is a LIDAR device or sensor, a laser device, and/or other device that collects data points, such as three-dimensional data, by transmitting and receiving light. In one embodiment, the LIDAR device is a sixty-four element LIDAR sensor HDL-64E from Velodyne, Inc, located in Morgan Hill, Calif. and/or a LMS200 series LIDAR sensor from SICK AG, located in Waldkirch, Germany. For example, one SICK LIDAR sensor (which may rotate at about 180° may provide fewer data points but with lower noise) and one sixty-four element LIDAR sensor from Velodyne (which may rotate at about 360° may provide more dense data points but with noisier data) may be used.

Collect 2D Imagery

In addition to the collection of 3D point cloud data, 2D images may also be captured using a data collection system, such as, but not limited to, the geographic or navigation data system depicted in FIGS. 1 and 2, and described above. In certain embodiments, the captured 2D images are color images.

Similar to the 3D data point collection, the 2D images may be collected using an object 104 (e.g., vehicle or pedestrian) having a supporting device 116 such as a camera. In certain embodiments, the 2D and 3D image data are collected using the same object and/or supporting device at a similar time, or approximately the same time. In certain embodiments, the 2D and 3D image data are collected using the same object and/or supporting device from a similar vantage point (i.e., capturing the image data from a similar geographic location using the object/supporting device positioned in the same direction). In other embodiments, the 2D and 3D image data are collected using a different object and/or supporting device, and the 2D and 3D data may be collected at different times.

In certain embodiments, one or more individual 2D images are captured from different angles or perspectives. In one particular embodiment, at least four individual 2D images are captured from different angles or perspectives. In another particular embodiment, at least six individual 2D images are captured from different angles or perspectives. For example, the 2D images may be captured from a Ladybug spherical vision camera device, available from Point Grey Research, Inc. (Richmond, BC, Canada).

The collected 2D image data may be stored on one or more non-transitory computer-readable media 120, such as a CD-ROM, DVD, flash drive, hard drive, or other tangible media suitable to store data. In certain embodiments, the 2D and 3D data are stored on the same computer-readable media. In other embodiments, the 2D and 3D data are stored on separate media.

Like the 3D image data, the collected 2D image data may be sent to a map, geographic, and/or navigation data developer 124, such as HERE, NAVTEQ, or Nokia Corporation, for further processing.

Colorizing the Point Cloud Data Using the 2D Imagery

In certain embodiments, the collected 3D point cloud data is further processed with the collected 2D image data. In certain embodiments, the 2D color images are used to colorize 3D point cloud. The colorization process may involve overlaying a 3D point cloud with a 2D image of the same scene. That is, in certain embodiments, 3D LIDAR point clouds are overlaid with 2D color images from the same perspectives. Based on this matching of 2D and 3D data, the 3D point cloud data may be colorized to form a 3D colored point cloud.

In other embodiments, if the 3D point cloud and the 2D color images are collected from different angles and/or positions, additional geometric calculations are necessary to properly align the point cloud and the 2D color image.

The associations between the pixels of the 2D color image and the point cloud depth values may be stored in a database. In other words, the 3D point cloud and the 2D color images may be pre-aligned and the overlaid or combined data is stored in the database.

In addition to the colorization process, the 3D data may also be processed prior to or after the colorization process. For example, 3D data points may be acquired in multiple sets through several LIDAR data acquisition sessions, and may need to be assembled into a unified point cloud on a common coordinate system for further processing. Multiple sets of 3D data points may be assembled into a unified point cloud using any registration technique. In an embodiment, a local registration technique is used between two sets of 3D data points. For example, Iterative Closest Point (ICP) techniques may be used to align the rotation and translation differences in the two 3D data point sets. ICP techniques may iteratively revise alignments or transformations to the 3D data point sets such that the distance, or measured difference, between the two 3D data point sets is minimized.

LIDAR point clouds may also undergo point cloud smoothing during processing to minimize or remove 3D data points that do not accurately represent a geographic area, or structures in a geographic area. Any point cloud smoothing technique may be used. In an embodiment, a moving least squares technique is used to minimize a weighted least square error for each 3D data point of the point cloud.

Developing an Equal Area Projection Panoramic Image

Through an overlaying and processing of the captured 2D image and 3D point cloud data and formation of a colorized point cloud having color pixels attributed to the x, y, and z coordinates for the 3D point cloud, a synthesized panoramic image may be created for a specified location. In certain embodiments, the panoramic image is formed using an equal area projection, wherein each quadrilateral unit or pixel chosen from the colorized point cloud represents the same amount of area. In other words, equal area projection refers to a projection in which quadrilaterals formed by lines of longitude and latitude have equal area.

The synthesis of the equal area projection panoramic image may comprise choosing a particular location and the field of view from that location. In certain embodiments, the panoramic image may comprise a complete spherical image, wherein the field of view is in every direction from the specified location (i.e., the image comprises 360 degrees worth of image data in both the latitudinal/horizontal and longitudinal/vertical directions). In other embodiments, the image may comprise a fraction or segment of a spherical image (e.g., at least 90 degrees, but less than 360 degrees in either the latitudinal or longitudinal directions). For example, the generated panoramic image may comprise a half sphere (i.e., 180 degrees in either the latitudinal or longitudinal direction and 360 degrees in the opposite direction). Additionally, the 2D image data may be correlated or matched with its geographic location coordinates. In certain embodiments, the data may be correlated or matched using GPS information from the data collection of the 2D images and/or 3D point cloud.

Storing the Panoramic Image

Figure 3:
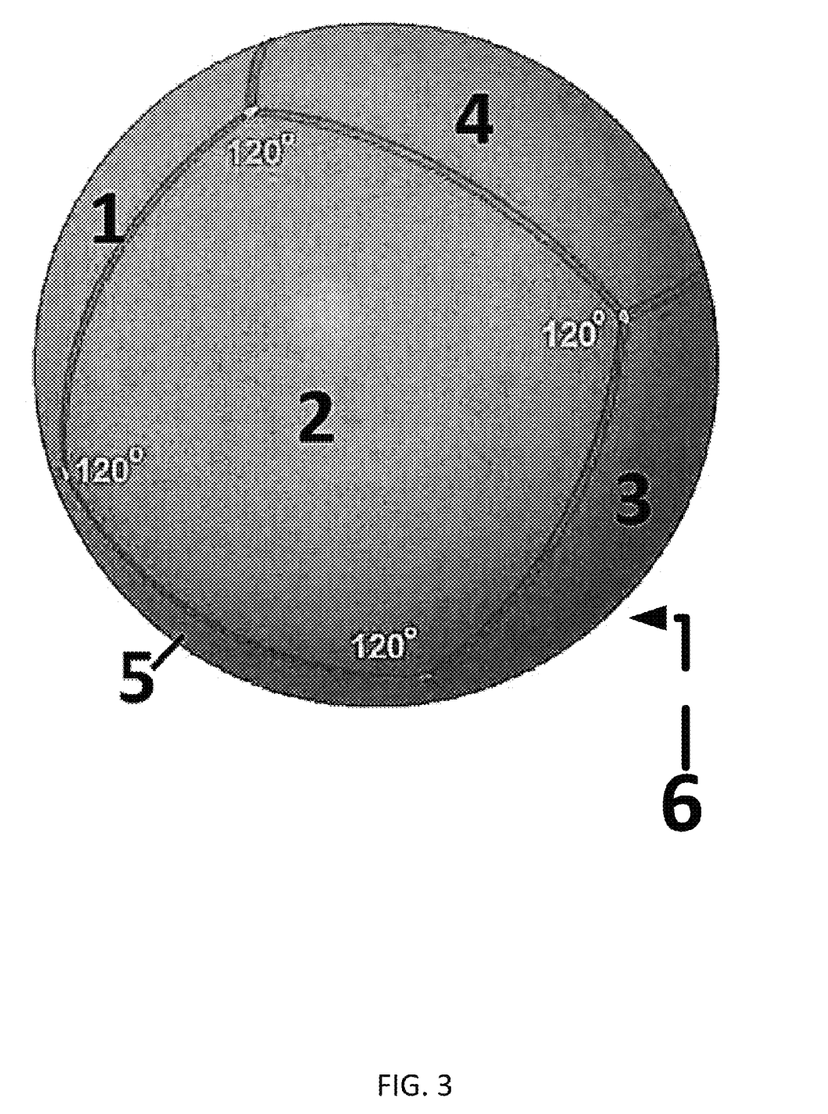
FIG. 3 illustrates an example of a quadrilaterized spherical cube projection having six cube faces.

In certain embodiments, the developed panoramic imagery data may be stored in a database using a quadrilaterized spherical cube projection. For example, the spherical or panoramic image may be projected onto faces of a cube using a curvilinear projection that preserves the area of each pixel of the image and does not distort the image at its edges. One embodiment of a quadrilaterized spherical cube projection is depicted in FIG. 3. In FIG. 3, the sphere is divided into six equal regions, where each region corresponds to a face of the cube, where the vertices of the cube correspond to the Cartesian coordinates defined by |x|=|y|=|z| on the unit sphere. Computation of the quadrilaterized spherical cube projection may only require computation of texture coordinates for the desired mesh or grid once, and may require less vertices or faces for the mesh of a similar quality as the grid points are more uniformly distributed on the surface of the sphere.

In some embodiments, to the extent less than a 360 degree panoramic image is generated, the developed imagery data may be stored in a database using a similar technique, wherein the partial sphere is divided into equal regions representing a portion of a cube.

Figure 4:
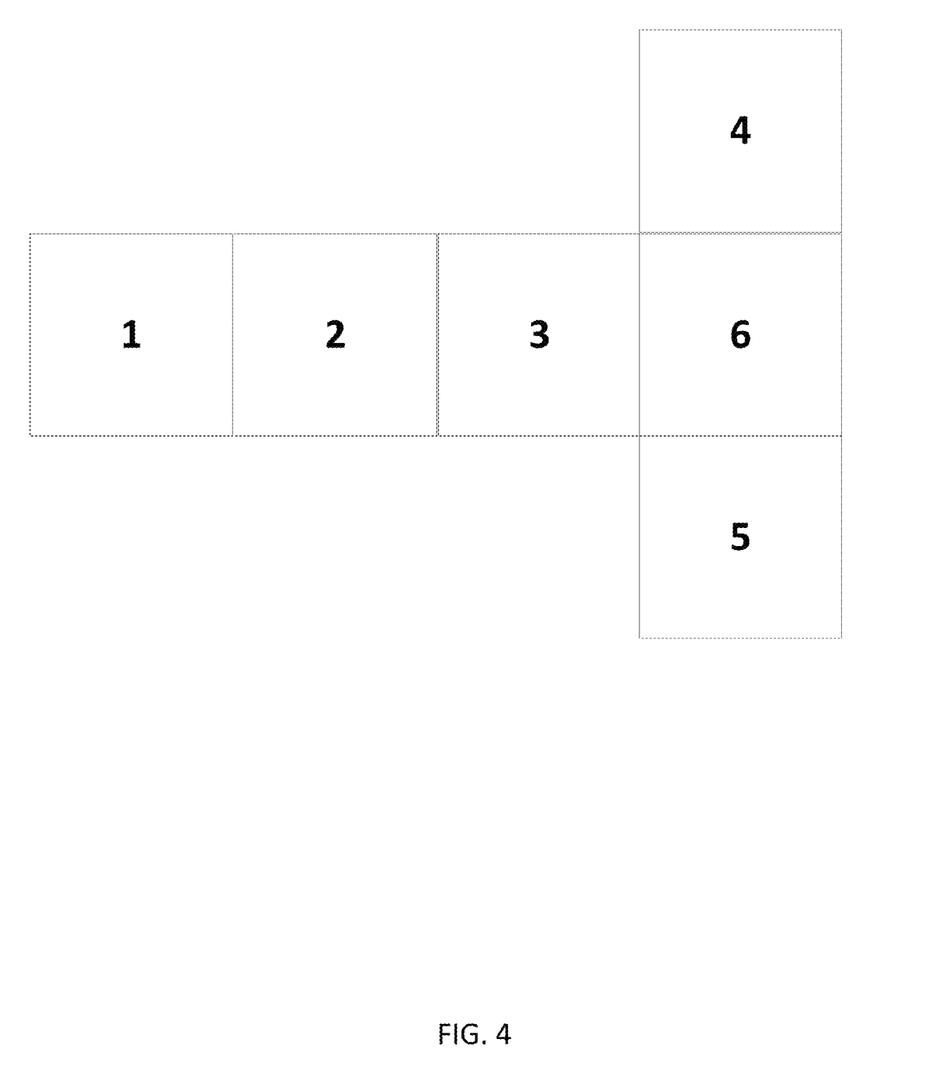
FIG. 4 illustrates an example of the cube faces of FIG. 3.

In certain embodiments, the faces of a quadrilaterized spherical cube may be depicted in a "T" shape configuration, wherein four faces of the cube are expanded along a shared axis, and the remaining two faces are represented on opposing sides of the axis. A non-limiting embodiment of a T-shape configuration is depicted in FIG. 4, wherein six regions of the sphere in FIG. 3 are depicted with faces 1, 2, 3, and 6 share a common axis, and faces 4 and 5 are represented on opposite sides of the common axis.

Figure 5:
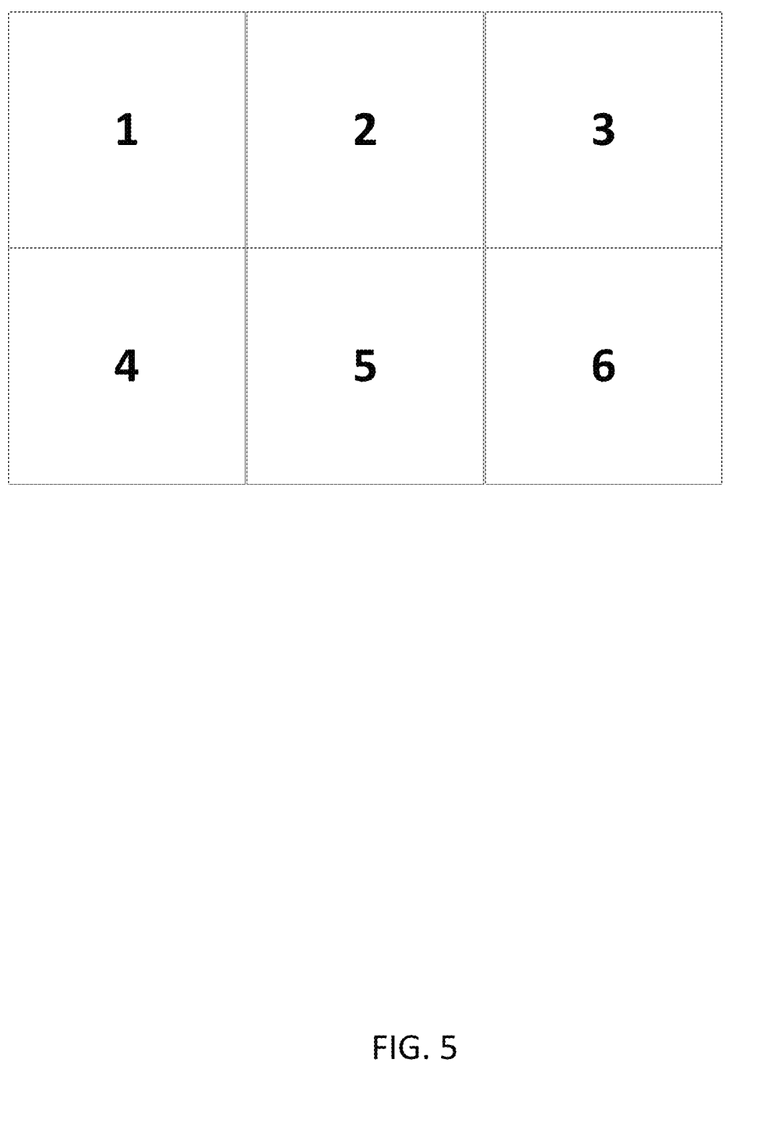
FIG. 5 illustrates an example of a compressed panoramic image, with rearranged cube faces of FIG. 4.

The faces of the cube may be rearranged to form a compact rectangle. One non-limiting embodiment of how the faces may be rearranged and compressed is depicted in FIG. 5. In FIG. 5, the cube faces from FIG. 4 are rearranged with faces 4, 5, and 6 shifted to be arranged below faces 1, 2, and 3.

Additional arrangement configurations are also possible for the compressed, compact rectangle (e.g., faces 4, 5, and 6 could be arranged in a different order below faces 1, 2, and 3). In certain embodiments, the faces are arranged in a rectangle formation to maximize the adjacency of bordering sides and achieve an optimal image compression rate.

Improvements Over Conventional Panoramic Image Development Techniques

In certain embodiments, the improved panoramic image comprises a reduced image resolution (or file size) over a similar, conventionally produced panoramic image (e.g., a plate carrée or cubic projection image).

Through these sampling and storage methods, the distortion pattern is identical in each cube face. Additionally, the image is bounded in contrast to other conventional projections. For example, a plate carrée projection has unbounded distortions in both distance and area. Additionally, a plate carrée projection or cubic projection may oversample imagery data in one direction and undersample imagery data in the opposite direction.

In some embodiments, the image resolution represents at least a 5%, 10%, 15%, 20%, or 25% reduction in data size over a similar conventionally produced image. For example, each face of the cube has a resolution of 1024 pixels by 1024 pixels. Upon rearrangement of the cube faces into a rectangle, the total resolution of the rearranged rectangle configuration has a total resolution of 3072 pixels by 2048 pixels.

Figure 6:
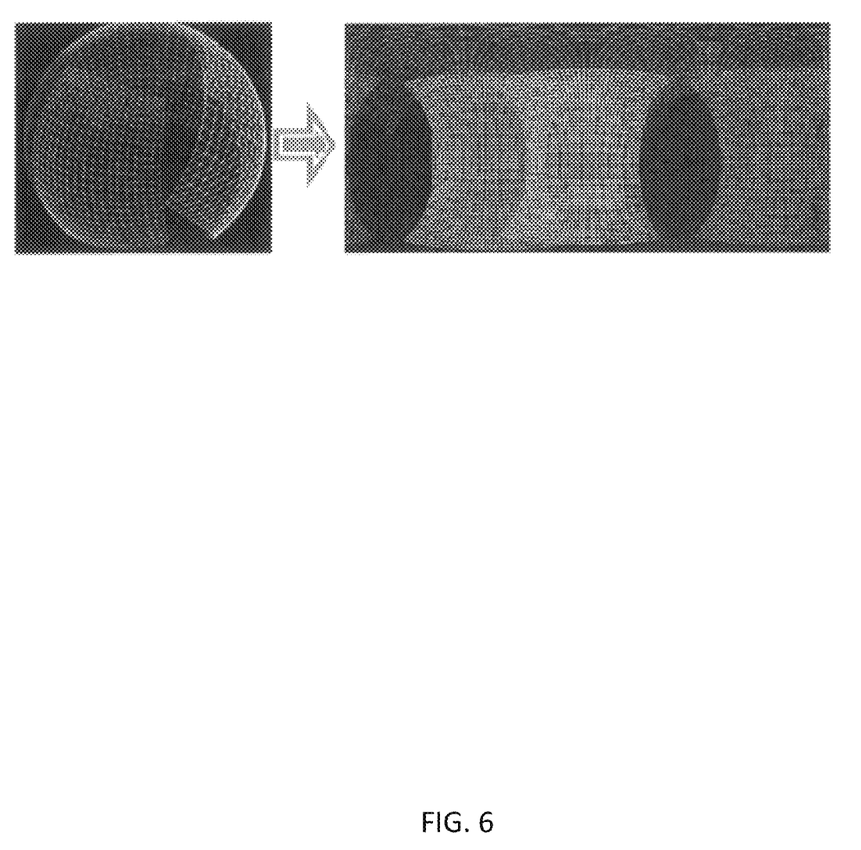
FIG. 6 illustrates an example of projecting a three-dimensional polygon mesh onto a two-dimensional plate carrée image.

In one particular embodiment, the improved panoramic image may have a 25% data reduction over a similar plate carrée projection image. An example of a plate carrée projection is depicted in FIG. 6, where a three-dimensional polygon mesh is collected and projected onto a two-dimensional panoramic image. As shown in FIG. 6, the panoramic image comprises oversampled image data at its edges or poles where several pixels overlap. In other words, developing a panoramic image through a plate carrée projection mechanism leads to an undesirable increase in the size of the overall image due to the oversampling of data closer to the edges or poles. For example, a plate carrée projection image may be developed from 4 rows and 8 columns of tiles, with each tile having a resolution of 512 pixels by 512 pixels, for a total resolution of 4096 pixels by 2048 pixels. In such a configuration, the top row and bottom row of tiles contains much less information, but consumes the same amount of storage space as each tile in the middle two rows. This is because the panoramic image is generated by sampling and interpolation (e.g., bilinear interpolation) from the plurality of 2D camera images (e.g., 6 camera images). The plate carrée projection makes the pixels closer to the poles greatly oversampled, increasing the amount of data stored.

As described above, through an equal area projection mechanism, oversampling of the pixels near the poles is reduced or avoided entirely. This may be explained in terms of a stretch factor st. Assuming a unit sphere, the stretch factor st is defined as the ratio between the area of the 2D image and the area of the sphere. The stretch factor may serve as an indicator of the efficiency of the data used to project onto the unit sphere. The stretch factor of a plate carrée projection is:

$$\text{st\_plate carrée} = \frac{2\pi * \pi}{4\pi} = \frac{\pi}{2} \approx 1.5.$$

The stretch factor for a cubic projection is:

$$\text{st\_cubic} = \frac{2*2*6}{4\pi} = \frac{6}{\pi} \approx 2.$$

In comparison, the stretch factor for an equal area projection is 1. As such, the equal area projection represents the most compact and efficient method of producing a panoramic image.

Retrieval, Viewing, and Use of the Panoramic Image

After storing the improved panoramic image in a database, the image may be retrieved by a personal computer, workstation, or mobile device at a later time for viewing. Alternatively, the compressed image data may be expanded to view the image in the 2D T-shape formation, where the faces of the cube are rearranged in a specified configuration.

Upon retrieval, the compressed/compacted panoramic image data may be expanded to view the image in its spherical alignment. Due to the smaller file size, the image may be retrieval or data transfer of the image to an end-user on a personal computer or mobile device may occur faster.

In certain embodiments, determination and retrieval of a panoramic image on a mobile device or computer may be used to provide functions for an autonomous vehicle. An autonomous vehicle is self-driving and may be referred to as a robot vehicle or an automated vehicle. The autonomous vehicle may include passengers but no driver is necessary. The mobile device or another computer system in communication with the mobile device may include instructions for routing the vehicle or operating the vehicle. An estimated travel time may be calculated based on the traffic map data and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

Figure 7:
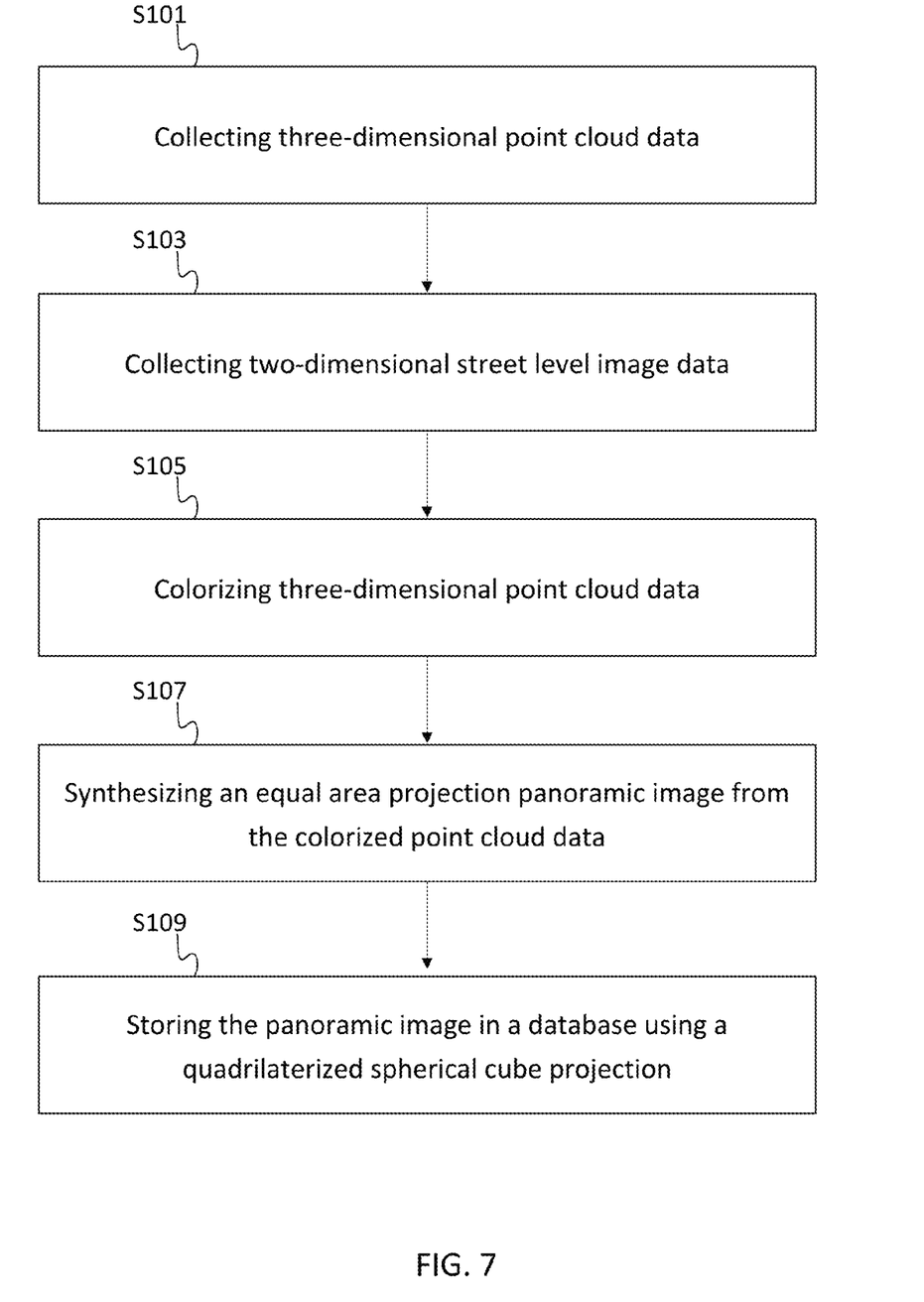
FIG. 7 illustrates an example flowchart for creating an equal area projection panoramic image.

FIG. 7 illustrates an example flowchart for creating an equal area projection panoramic image. The process of the flowchart may be performed by the navigation data system 100 or device 201 described and shown in FIGS. 1 and 2. Alternatively, another device may be configured to perform one or more of the following acts. Additional, fewer, or different acts may be included.

At act S101, the geographic or navigation data system or device collects 3D point cloud image data. In certain embodiments, the 3D data is acquired using 3D optical distancing systems or intensity-based scanning techniques, such as a LIDAR system, described above. In one embodiment, a LIDAR data acquisition system may be attached or otherwise integrated with a vehicle. There may also be a positioning system integrated with the LIDAR vehicular system such as a GPS to provide a base reference for the data acquired by the LIDAR system. The mobility of a vehicular system may facilitate acquiring data across a large geographic area using established positions for reference and integration of the acquired data into a point cloud representing the geographic area. FIG. 1, discussed above, shows one embodiment of a geographic and/or navigation data system 100 useful for collecting the 3D data points.

At act S103, the system or device collects 2D image data. In addition to the collection of the 3D point cloud data, the 2D images may also be captured using a 2D data collection system, such as, but not limited to, the geographic or navigation data system shown in FIGS. 1 and 2, and described above. In certain embodiments, acts S101 and S103 may be performed by the same system or device at a similar time (or approximately the same time).

At act S105, the 3D point cloud data is colorized using the 2D image data. The colorization process may involve overlaying a 3D point cloud image with a 2D image of the same scene. That is, in certain embodiments, 3D LIDAR point clouds are overlaid with 2D color images from the same perspectives. Based on this matching of 2D and 3D image data, the 3D point cloud data may be colorized to form a 3D colored point cloud image. In other embodiments, if the 3D point cloud and the 2D color images are collected from different angles and/or positions, additional geometric calculations are necessary to properly align the point cloud image and the 2D color image.

At act S107, an equal area projection panoramic image is synthesized from the colorized three-dimensional point cloud, wherein the panoramic image comprises a plurality of pixels, and each pixel in the plurality of pixels represents a same amount of area. In certain embodiments, the panoramic image may comprise a complete spherical image. In other embodiments, the image may comprise a fraction or segment of a spherical image.

At act S109, the developed panoramic imagery data is stored in a database using a quadrilaterized spherical cube projection. In certain embodiments, the spherical or panoramic image is projected onto faces of a cube using a curvilinear projection that preserves the area of each pixel of the image and does not distort the image at its edges.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, and HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   receiving a three-dimensional point cloud generated from an optical distancing system;
   receiving at least one two-dimensional image generated from at least one camera;
   colorizing the three-dimensional point cloud with the at least one two-dimensional image, thereby forming a colorized three-dimensional point cloud;
   synthesizing, using a processor, an equal area projection panoramic image from the colorized three-dimensional point cloud, wherein the panoramic image comprises a plurality of pixels, and each pixel in the plurality of pixels represents a same amount of area, wherein the equal area projection panoramic image is a complete spherical image having 360 degrees of image data in both a latitudinal direction and a longitudinal direction;
   dividing, using the processor, the equal area projection panoramic image into six equal regions defining six faces of a cube, wherein each region corresponds to a face of the cube; and
   storing the six cube faces of the complete spherical image in a database in a rectangular formation to provide a compressed image, wherein the rectangular formation is represented by two rows of cube faces and three columns of cube faces.

2. The method of claim 1, wherein the receiving comprises six two-dimensional images generated from six cameras.

3. The method of claim 1, further comprising matching the equal area projection panoramic image with geographic coordinates.

4. The method of claim 3, wherein the matching is performed using global positioning system geographic coordinates collected from the three-dimensional point cloud image or the at least one two-dimensional image.

5. The method of claim 1, wherein the optical distancing system is a Light Detection and Ranging system.

6. The method of claim 1, further comprising retrieving the stored panoramic image on a mobile device, personal computer, or workstation, wherein the compressed configuration is rearranged for viewing the complete spherical image.

7. A method comprising:
   receiving a three-dimensional point cloud generated from a Light Detection and Ranging system;
   receiving six two-dimensional images generated from six cameras;
   colorizing the three-dimensional point cloud with the two-dimensional images, thereby forming a colorized three-dimensional point cloud;
   synthesizing, using a processor, an equal area projection panoramic image from the colorized three-dimensional point cloud, wherein the panoramic image comprises a plurality of pixels, and each pixel in the plurality of pixels represents a same amount of area, and the panoramic image is a complete spherical image having 360 degrees of image data in both a latitudinal direction and a longitudinal direction;
   dividing the complete spherical image into six equal regions defining six faces of a cube using a quadrilaterized spherical cube projection, wherein each region corresponds to a face of the cube; and
   storing the panoramic image in a database, wherein the six faces of the cube are arranged in a compressed rectangular configuration represented by two rows of cube faces and three columns of cube faces.

8. An apparatus comprising:
   at least one processor; and
   at least one memory including computer program code for one or more programs; the at least one memory and the computer program code configured to, with the at least one processor, cause the apparatus to at least perform:
   receive a three-dimensional point cloud image generated from an optical distancing system;
   receive at least one two-dimensional image generated from at least one camera;
   colorize the three-dimensional point cloud image with the at least one two-dimensional image to form a colorized three-dimensional point cloud image;
   synthesize an equal area projection panoramic image from the colorized three-dimensional point cloud, wherein the panoramic image comprises a plurality of pixels, and each pixel in the plurality of pixels represents a same amount of area, wherein the equal area projection panoramic image is a complete spherical image having 360 degrees of image data in both a latitudinal direction and a longitudinal direction;
   divide the complete spherical image into six equal regions defining six faces of a cube using a quadrilaterized spherical cube projection, wherein each region corresponds to a face of the cube; and
   store the six cube faces of the complete spherical image in a database in a rectangular formation to provide a compressed image, wherein the rectangular formation is represented by two rows of cube faces and three columns of cube faces.

9. The apparatus of claim 8, wherein the equal area projection panoramic image comprises an improved image compression rate in comparison with a similar panoramic image developed by a plate carrée projection or a cubic projection.

10. The apparatus of claim 8, wherein the at least one memory and the computer program code are configured to cause the apparatus to further perform:

match the equal area projection panoramic image with geographic coordinates using global positioning system geographic coordinates collected from the three-dimensional point cloud image or the at least one two-dimensional image.

11. The apparatus of claim 8, wherein the at least one memory and the computer program code are configured to cause the apparatus to further perform:
retrieve the stored panoramic image on a mobile device, personal computer, or workstation, wherein the compressed configuration is rearranged for viewing the complete spherical image.

* * * * *